US012458429B2

(12) United States Patent
Chen (10) Patent No.: US 12,458,429 B2
(45) Date of Patent: Nov. 4, 2025

(54) ELECTROCARDIOGRAM WAVEFORM-BASED ADAPTIVE PULSE ABLATION INSTRUMENT

(71) Applicant: Hangzhou Ready Biological Technology Co., Ltd, Zhejiang (CN)

(72) Inventor: Yonggang Chen, Zhejiang (CN)

(73) Assignee: HANGZHOU READY BIOLOGICAL TECHNOLOGY CO., LTD, Zhejiang (CN)

(*) Notice: Subject to any disclaimer, the term of this patent is extended or adjusted under 35 U.S.C. 154(b) by 841 days.

(21) Appl. No.: 17/417,316

(22) PCT Filed: Aug. 19, 2019

(86) PCT No.: PCT/CN2019/101287
§ 371 (c)(1),
(2) Date: Jun. 22, 2021

(87) PCT Pub. No.: WO2020/140440
PCT Pub. Date: Jul. 9, 2020

(65) Prior Publication Data
US 2021/0346079 A1 Nov. 11, 2021

(30) Foreign Application Priority Data

Dec. 31, 2018 (CN) .......................... 201811651752.9
Mar. 29, 2019 (CO) .......................... 201910247941.8

(51) Int. Cl.
*A61B 18/12* (2006.01)
*A61B 5/00* (2006.01)
(Continued)

(52) U.S. Cl.
CPC .......... *A61B 18/1233* (2013.01); *A61B 5/349* (2021.01); *A61B 5/366* (2021.01);
(Continued)

(58) Field of Classification Search
CPC ... A61B 18/1233; A61B 5/366; A61B 5/4848; A61B 2018/00577; A61B 2018/00642; A61B 2018/00839
See application file for complete search history.

(56) References Cited

U.S. PATENT DOCUMENTS 6,650,931 B1 * 11/2003 McClure ................. A61B 5/349
600/510
9,277,956 B2 3/2016 Zhang
(Continued)

FOREIGN PATENT DOCUMENTS

AU 2013337879 A1 * 5/2015 ......... A61B 18/1492
CN 104783894 A 7/2015
(Continued)

*Primary Examiner* — Joanne M Rodden
*Assistant Examiner* — Dana Stumpfoll
(74) *Attorney, Agent, or Firm* — MUNCY, GEISSLER, OLDS & LOWE, P.C.

(57) ABSTRACT

An electrocardiographic waveform-based adaptive pulse ablatograph includes at least two electrodes configured to transmit an ablation pulse to a tissue during use; a pulse waveform generator coupled to the electrodes and configured to transmit a nanosecond pulse having a voltage of 15 kv-35 kv to the electrodes; an electrocardiographic detection device configured to collect an electrocardiographic waveform signal; and a control device in signal connection to the electrocardiographic detection device and in control connection to the pulse waveform generator. By controlling duration of pulse release and the magnitude of pulse energy of the pulse waveform generator and the electrodes in the effective refractory period, the control device makes dynamic adjustment quickly according to a real-time heartbeat of a patient, thus increasing the proportion of the pulse release duration in the effective refractory period and improving the safety.

18 Claims, 10 Drawing Sheets (51) Int. Cl.
  *A61B 5/349* (2021.01)
  *A61B 5/366* (2021.01)
  *A61B 18/00* (2006.01)
(52) U.S. Cl.
  CPC .. *A61B 5/4848* (2013.01); *A61B 2018/00577* (2013.01); *A61B 2018/00613* (2013.01); *A61B 2018/00642* (2013.01); *A61B 2018/00672* (2013.01); *A61B 2018/00678* (2013.01); *A61B 2018/00839* (2013.01)

(56) References Cited

U.S. PATENT DOCUMENTS

| | | | |
|---|---|---|---|
| 2005/0197675 A1* | 9/2005 | David | A61B 5/412 607/9 |
| 2008/0146918 A1* | 6/2008 | Magnin | A61B 8/4461 600/437 |
| 2010/0280513 A1* | 11/2010 | Juergen | A61B 18/1477 606/41 |
| 2015/0182740 A1* | 7/2015 | Mickelsen | A61M 25/0606 606/41 |
| 2016/0166310 A1* | 6/2016 | Stewart | A61B 18/1492 606/34 |
| 2017/0189097 A1* | 7/2017 | Viswanathan | A61N 1/0587 |
| 2019/0060632 A1* | 2/2019 | Asirvatham | A61N 1/327 |

FOREIGN PATENT DOCUMENTS

| | | | |
|---|---|---|---|
| CN | 107233664 | * | 7/2017 |
| CN | 107582166 | * | 10/2017 |
| CN | 107582166 | A | 1/2018 |
| CN | 107921258 | A | 4/2018 |
| CN | 108778172 | A | 11/2018 |
| CN | 109820592 | A | 5/2019 |

* cited by examiner

ELECTROCARDIOGRAM WAVEFORM-BASED ADAPTIVE PULSE ABLATION INSTRUMENT

TECHNICAL FIELD

The present application relates to the technical field of biological tissue ablation, in particular to an electrocardiographic waveform-based adaptive pulse ablatograph.

BACKGROUND ART

The high-voltage nanosecond pulse therapy instrument is a medical apparatus for targeted apoptosis induction, wherein the working principle thereof is generating an ultra-short high-voltage mutation (steep pulse) electric field between two positive and negative electrodes, so as to generate temporary nanopores in membranes and organelles of a specific type of cells (including cancer cells) between and around the electrodes. These temporary nanopores allow penetration of ions such as calcium ($Ca^{2+}$), potassium ($K+$), and sodium ($Na+$) ions through these membranes, destroying cell structures and functions, changing cell signaling, and thereby inducing programmed cell death. Finally, dead cells are engulfed by adjacent cells or macrophages.

Compared with the conventional physical cancer therapy means such as radiofrequency and microwave therapies, the therapy means of inducing the target cells (cancerous cells) to perform the apoptosis procedure by means of high-voltage nanosecond pulses and finally ablating the cells has mild side effects. In a specific range, if the voltage of the pulses is higher, the cycle thereof is shorter, and the side effects on the human body are milder, thereby resulting in a better therapeutic effect.

The existing method for generating high-voltage nanosecond pulses is realized mainly by means of high-voltage capacitor discharge, Marx discharge, discharge using a single transmission line or double transmission lines consisting of high-voltage coaxial cables, and by simulating coaxial cable discharge using multi-level equivalent inductance-capacitance lumped parameters. Due to technical restrictions, the voltage of the high-voltage nanosecond pulses generated by these discharge technologies is mostly about 15 kV, which greatly limits the therapeutic effect.

In addition, the existing high-voltage nanosecond ablation device generally has only two electrodes, and the ablation range is limited. With the progress of the operation process, it is necessary to adjust the positions of the electrodes continuously according to the ablation of diseased tissues during the operation, so as to ensure a better therapeutic effect, which undoubtedly increases the operation time and also increases the potential risk of patients during the operation. At the same time, during the ablation, the body fluid seeping from the tissues may change the impedance between the two electrodes, thus reducing the actual pulse voltage acting on the diseased cells, and thereby reducing the therapeutic effect.

In addition, during the operation, some physiological conditions, especially the heart rhythm, of the patient may change under the influence of the operation. The life of the patient is endangered if no response is performed in time. For example, Chinese patent application No. 201710948333.0 has disclosed an electrocardio-synchronization system for high-voltage steep-pulse ablation, wherein the system outputs pulses within 50 ms-200 ms after the identification of electrocardiographic R-waves, a time window of the output pulses is fixed, and no calculation of a cardiac refractory period is performed for a specific individual. In the case where the heartbeat of the patient is accelerated due to electrical pulse stimulation, the pulse output of the system is also accelerated, further aggravating the adverse reaction, such that an effective determination and timely feedback cannot be made, thereby resulting in a potential safety hazard.

Therefore, how to alleviate the adverse influence of high-voltage nanosecond pulses on the effective refractory period while maintaining the high proportion of ablation pulses in the effective refractory period is one of the problems to be solved urgently.

SUMMARY

The technical problem to be solved by the present application is to provide an electrocardiographic waveform-based adaptive pulse ablatograph which can dynamically adjust release of pulse energy with a change in an electrocardiographic waveform (effective refractory period), to overcome the defect of a fixed time window of ablation pulses released by the existing ablatograph in the effective refractory period, such that release timing is more reasonable and the safety and effectiveness are higher.

In order to achieve the above object, the present application is implemented by means of the following technical solution: an electrocardiographic waveform-based adaptive pulse ablatograph, comprising:

at least two electrodes configured to transmit an ablation pulse to a tissue during use;

a pulse waveform generator coupled to the electrodes and configured to transmit a nanosecond pulse having a voltage of 15 kv-35 kv to the electrodes;

an electrocardiographic detection device configured to collect an electrocardiographic waveform signal; and a control device in signal connection to the electrocardiographic detection device and in control connection to the pulse waveform generator; wherein the control device receives the electrocardiographic waveform signal; before the electrodes transmit the ablation pulse for the first time, the control device determines a heart rhythm range and upper and lower thresholds of an effective refractory period time by receiving a section of an electrocardiographic waveform signal;

the control device controls duration of a connected state between the pulse waveform generator and the electrodes in a current effective refractory period according to a previous effective refractory period time; the duration of the connected state between the pulse waveform generator and the electrodes in the current effective refractory period is positively correlated with the previous effective refractory period time; and the control device compares an extreme value of the current effective refractory period with the upper and lower thresholds of the effective refractory period time, if the extreme value of the current effective refractory period is between the upper and lower thresholds of the effective refractory period time, continues to control the electrodes and the pulse waveform generator to be connected again in a next effective refractory period, and if the extreme value of the current effective refractory period is not between the upper and lower thresholds of the effective refractory period time, controls, after pulse energy is decreased, the electrodes to transmit the ablation pulse.

By adopting the above technical solution, a section of the electrocardiographic signal (of a patient) is collected by the electrocardiographic detection device (before the electrodes transmit the ablation pulse for the first time), the waveform is analyzed and identified, and a heartbeat range and an effective refractory period time range of the patient receiving no ablation pulse are calculated. According to an actual situation, an operator can make an appropriate adjustment on the basis of results of the above calculation, and configure a heart rate and the upper and lower thresholds of the effective refractory period time in the control device. After the pulse is applied, the heart rate of the patient and the refractory period time are monitored in real time, and the effective refractory periods of two adjacent released pulses are spaced apart by at least one effective refractory period (only the one in which no pulse is released is monitored). When the heartbeat and the refractory period time are close to the preset thresholds, energy of the released pulse is decreased, comprising reducing the pulse voltage and the number or length of pulses transmitted in the refractory period. Due to a difference between health statuses of different patients, there are differences in the heart rhythm range and the effective refractory period time. Compared with the prior art, a time length and the energy of the pulse released by the electrodes in the effective refractory period in this solution are dynamically adjusted according to the real-time heartbeat of the patient, to alleviate an adverse influence on the heartbeat of the patient as far as possible while the pulse energy can be flexibly adjusted, thus increasing the proportion of a pulse release time in the effective refractory period and improving the safety.

In a further alternative solution of the present application, measures for decreasing the pulse energy comprise reducing the voltage of the pulse generated by the pulse waveform generator and decreasing the number or length of pulses released by the electrodes in a single effective refractory period.

In a further alternative solution of the present application, the pulse width is between 100 ns-300 ns.

In a further alternative solution of the present application, the control device is further connected to a memory configured to store a database of a heartbeat effective refractory period time of healthy people; if the extreme value of the current effective refractory period exceeds the upper and lower thresholds of the effective refractory period time, the control device compares the extreme value of the current heartbeat effective refractory period with the database in the memory; if the extreme value of the current heartbeat effective refractory period is between upper and lower thresholds of the heartbeat effective refractory period of the healthy people, the control device controls the pulse waveform generator to decrease the pulse energy and then connects the pulse waveform generator to the electrodes; and if the extreme value of the current heartbeat effective refractory period is beyond the upper and lower thresholds of the heartbeat effective refractory period of the healthy people, the control device keeps the pulse waveform generator and the electrodes in a disconnected state in the next effective refractory period.

In a further alternative solution of the present application, when the control device controls the pulse waveform generator to decrease the pulse energy, a decrease range of the pulse energy is within 50%.

In a further alternative solution of the present application, the database of the heartbeat effective refractory period time of the healthy people comprises heart rhythm statistical information of healthy people in the same gender and at similar ages as the patient.

In a further alternative solution of the present application, in the step d, the decrease range of the pulse energy is within 50%.

In a further alternative solution of the present application, the database of the heartbeat effective refractory period time of the healthy people comprises statistical data of heart rhythm information of the healthy people in different genders and age brackets; and when comparing the current effective refractory period with the information in the database, the control device selects heart rhythm statistical information of healthy people in the same gender and at similar ages as a current sampled patient In a further alternative solution of the present application, the effective refractory period is an RT period of the electrocardiographic waveform, and the RT period is determined by detecting a QRS wave by means of a dynamic differential threshold method.

In a further alternative solution of the present application, the ablatograph further comprises a feedback circuit for determining a therapeutic effect according to impedance of a diseased tissue between the two electrodes, wherein the feedback circuit comprises a voltage detection circuit and a current detection circuit.

In a further alternative solution of the present application, the pulse energy E, the pulse width t, the number N of pulses in a single heartbeat refractory period, a voltage U between the two electrodes, and the impedance R of the tissue between the two electrodes have the following relationship: $E=(U2Nt)/R$.

To sum up, the present application has the following beneficial effects: on the one hand, the pulse energy is adjusted adaptively according to the heart rhythm of the patient, wherein the pulse energy can be decreased by reducing the pulse voltage or decreasing the number or width of the pulses released in the heartbeat effective refractory period time, or by a combination thereof on the other hand, the therapeutic effect is determined by detecting the impedance of the diseased tissue between the electrodes for trouble shooting or interruption of the pulse release in the next heartbeat effective refractory period, thus greatly improving the safety.

REFERENCE NUMERALS

1—electrocardiographic detection device; 2—control device; 3—pulse waveform generator; 4—electrode selection circuit; 5—current sampling circuit; 6—current detection circuit; 7—voltage sampling circuit; 8—voltage detection circuit.

DESCRIPTION OF THE EMBODIMENTS

The present application will be further described below in detail with reference to the drawings.

The embodiments are only used for explaining the present application instead of limiting the present application. Those skilled in the art may make modifications to the embodiments as needed without contributing any inventive labor after reading the description, which, however, are protected by the Patent Law as long as the modifications fall within the scope of the claims of the present application.

The present application discloses an electrocardiographic waveform-based adaptive pulse ablatograph, which includes electrodes, a pulse waveform generator 3, an electrocardiographic detection device 1, and a control device 2.

At least two, may be three or four, etc., electrodes are provided, fixed by using grippers, and configured to transmit an ablation pulse to a tissue during use.

The pulse waveform generator 3 is coupled to the electrodes and configured to transmit a nanosecond pulse having a voltage of 15 kv-35 kv to the electrodes. The width of the pulse is between 100 ns-300 ns. Only two of the electrodes are connected at each time. The electrocardiographic detection device 1 is configured to collect an electrocardiographic waveform signal and transmit the signal to the control device 2 in real time.

The control device 2 is in signal connection to the electrocardiographic detection device 1 and in control connection to the pulse waveform generator. The control device 2 receives the continuous electrocardiographic waveform signals, computes and analyzes the electrocardiographic waveform signal, makes a determination according to a preset condition, and controls the pulse waveform generator to complete a preset action if the preset condition is met.

Before the electrodes transmit the ablation pulse for the first time, the control device 2 determines a heart rhythm range and upper and lower thresholds of an effective refractory period time by receiving a section of an electrocardiographic waveform signal (via a DSP chip). The section of electrocardiographic waveform signal includes a plurality of continuous heartbeats (effective refractory periods). Generally, a continuous section of more than ten seconds or tens of seconds is selected as a section. Moreover, a plurality of sections may be selected on this basis to analyze, compute, and determine the upper and lower thresholds of the heartbeat effective refractory period. The upper and lower thresholds of the effective refractory period obtained by analysis and computation on one or a plurality of sections of electrocardiographic waveform signal before the electrodes transmit the ablation pulse for the first time are referred to as upper and lower thresholds of the effective refractory period time. It should be noted that the effective refractory period is an RT period of the electrocardiographic waveform, and the RT period is determined by detecting a QRS wave by means of a dynamic differential threshold method, which is not described herein in detail.

When the control device 2 controls the pulse waveform generator 3 to be connected to the electrodes at each time, the control device 2 controls duration of a connected state between the pulse waveform generator 3 and the electrodes in a current effective refractory period according to a previous effective refractory period time. The duration of the connected state between the pulse waveform generator 3 and the electrodes in the current effective refractory period is positively correlated with the length of the previous effective refractory period time.

For example, the electrocardiographic waveform signals continuously received by the control device 2 are numbered continuously, wherein each heartbeat corresponds to a serial number. Assuming that the control device 2 controls the pulse waveform generator 3 to be connected to the electrodes in the N-th heartbeat effective refractory period (i.e., the current effective refractory period), the duration of connection between the pulse waveform generator 3 and the electrode depends on duration of the (N−1)-th heartbeat effective refractory period (i.e., the previous effective refractory period). If the (N−1)-th heartbeat effective refractory period is long, the duration of the connection between the pulse waveform generator 3 and the electrodes is long, that is, the number (or referred to as pulse width length) of released pulses is large; if the (N−1)-th heartbeat effective refractory period is short, the duration of the connection between the pulse waveform generator 3 and the electrodes is short, that is, the number of released pulses is small. That is to say, the proportion of the pulse width length in the effective refractory period is kept high as far as possible.

Therefore, the effective refractory periods of two adjacent released pulses are spaced apart by at least one effective refractory period (only the one in which no pulse is released is monitored).

In order to improve the safety, the magnitude of energy of the released pulse is adjusted in time or the pulse release is interrupted. The control device 2 firstly compares an extreme value of the current effective refractory period with the upper and lower thresholds of the effective refractory period time, if the extreme value of the current effective refractory period is between the upper and lower thresholds of the effective refractory period time, continues to control the electrodes and the pulse waveform generator 3 to be connected again in a next effective refractory period, and if the extreme value of the current effective refractory period is not between the upper and lower thresholds of the effective refractory period time, controls, after pulse energy is decreased, the electrodes to transmit the ablation pulse.

Measures for decreasing the pulse energy comprise reducing the voltage of the pulse generated by the pulse waveform generator 3 and decreasing the number or length of pulses released by the electrodes in a single effective refractory period.

The pulse energy E, the pulse width t, the number N of pulses in a single heartbeat refractory period, a voltage U between the two electrodes, and the impedance R of the tissue between the two electrodes have the following relationship: $E=(U^2Nt)/R$. When the control device 2 controls the pulse waveform generator 3 to decrease the pulse energy, a decrease range of the pulse energy is within 50%.

The control device 2 is further connected to a memory configured to store a database of a heartbeat effective refractory period time of healthy people. The database of the heartbeat effective refractory period time of the healthy people comprises statistical data of heart rhythm information of the healthy people in different genders and age brackets. When comparing the current effective refractory period with the information in the database, the control device selects heart rhythm statistical information of healthy people in the same gender and at similar ages as a current sampled patient.

If the extreme value of the current effective refractory period exceeds the upper and lower thresholds of the effective refractory period time, the control device 2 compares the extreme value of the current heartbeat effective refractory period with the database in the memory. If the extreme value of the current heartbeat effective refractory period is between the upper and lower thresholds of the heartbeat effective refractory period of the healthy people, the control device 2 controls the pulse waveform generator 3 to decrease the pulse energy and then connects the pulse waveform generator 3 and the electrodes. If the extreme value of the current heartbeat effective refractory period is beyond the upper and lower thresholds of the heartbeat effective refractory period of the healthy people (or the extreme value of the current heartbeat effective refractory period is lower than the lower limit of the heartbeat effective refractory period of the healthy people, the control device 2 keeps the pulse waveform generator 3 and the electrodes in a disconnected state in the next effective refractory period.

Figure 1:
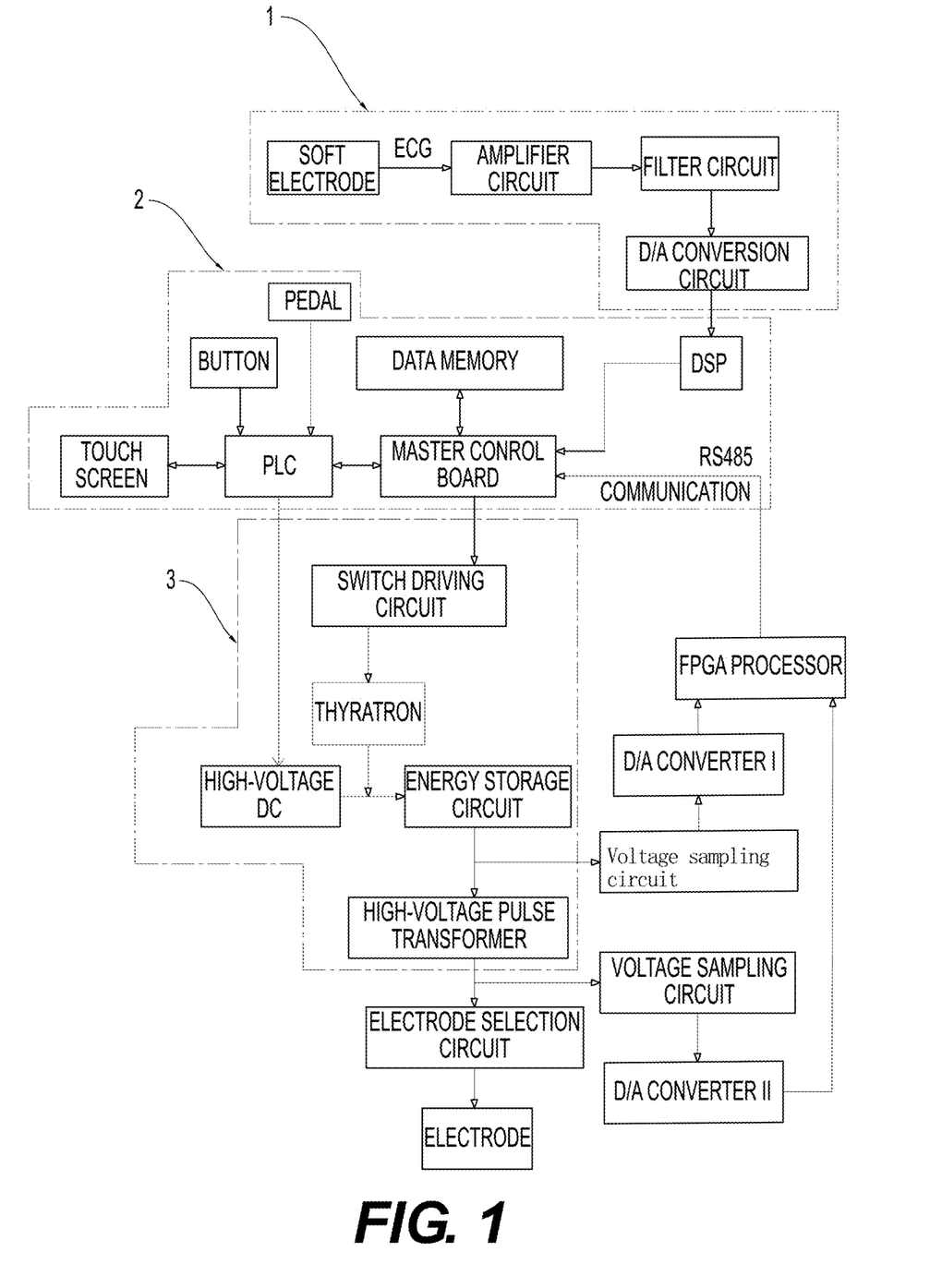
FIG. 1 is a schematic block diagram of a system according to the embodiment.
Figure 4:
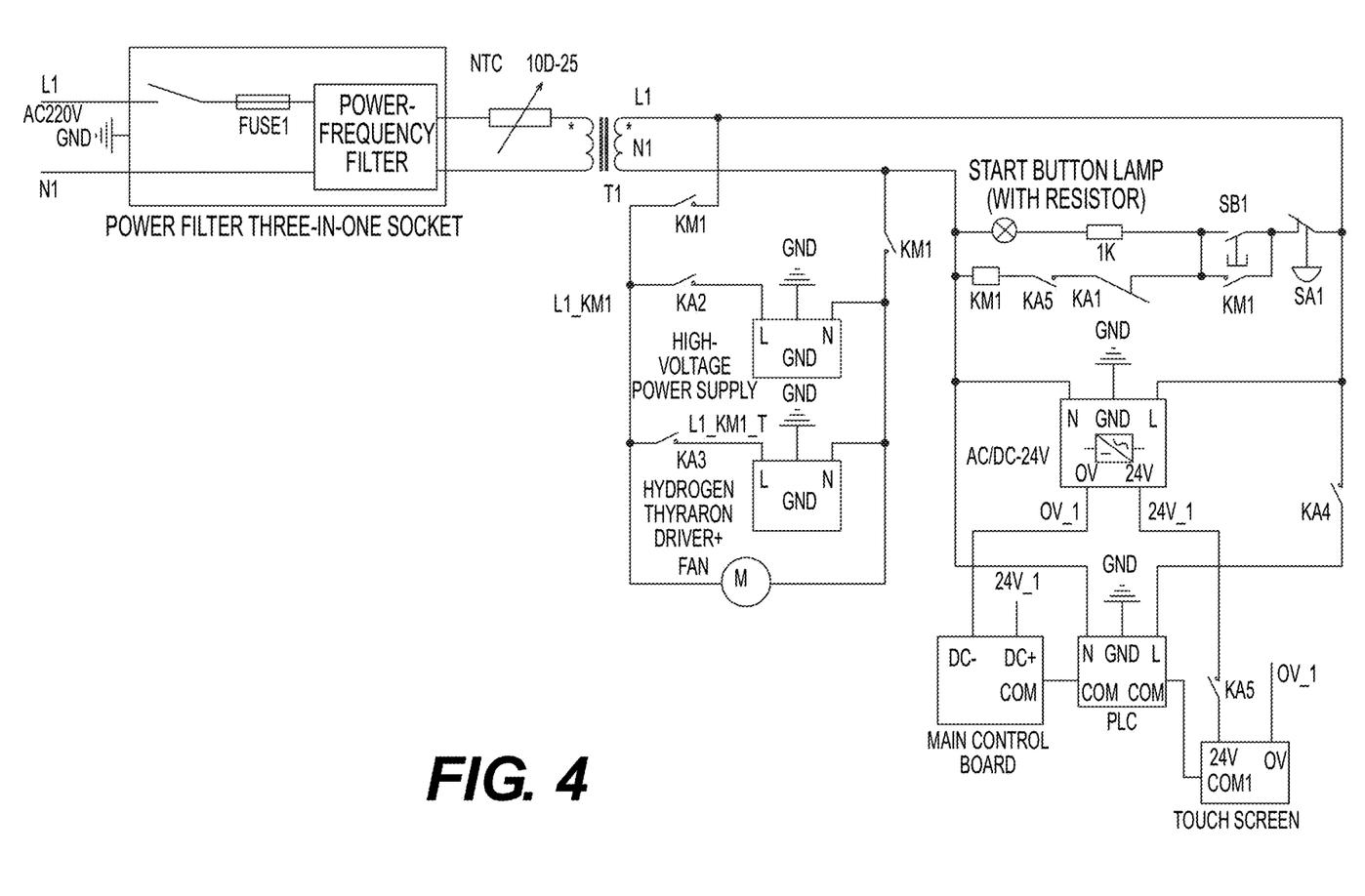
FIG. 4 is an electrical control diagram of the present application.

FIG. 1 and FIG. 4 illustrate a schematic circuit block diagram and an electrical control diagram of the electrocardiographic waveform-based adaptive pulse ablatograph. In this embodiment, the control device 2 of the ablatograph includes a master control board, a PLC, a DSP, and a data memory which are connected to the master control board, and various input and output devices connected to the PLC. The input devices include a button (switch) and a pedal (switch), and the output device includes a touch screen. The master control board is provided with a CPU, which is a host computer in this embodiment.

The electrocardiographic detection device 1 includes soft electrodes, an amplifier circuit, a filter circuit, and a D/A conversion circuit. After detected by the soft electrodes, the electrocardiographic signal is shaped and processed by the amplifier circuit and the filter circuit. Then, the analog signal is converted into a digital signal by the D/A conversion circuit (in this embodiment, an ADS550 D/A digital-to-analog converter is adopted), and the digital signal is finally transmitted to the DSP (in this embodiment, a TMS320F28x digital signal processing chip is adopted). The DSP performs analysis and computation processing to obtain data such as the heart rate, the duration of the effective refractory period, and the upper and lower thresholds of the effective refractory period, which is then transmitted to the master control board.

Figure 2:
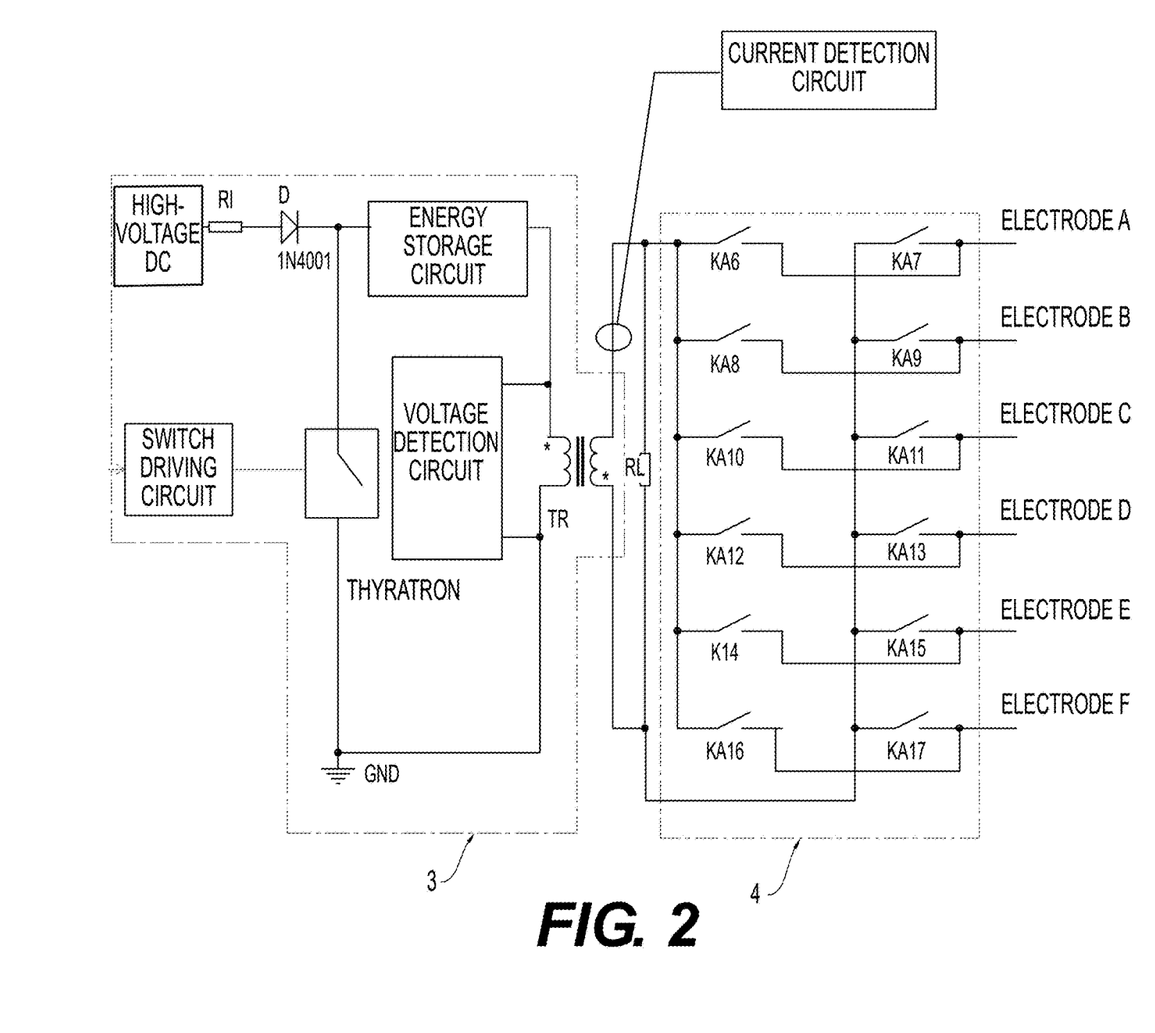
FIG. 2 is a schematic diagram of a pulse generator and electrodes.

Referring to FIG. 2, the pulse waveform generator 3 includes a high-voltage direct current (power supply), an energy storage circuit, a high-voltage pulse transformer, a thyratron (in this embodiment, a hydrogen thyratron is adopted), and a switch driving circuit for driving the thyratron to act. The high-voltage direct current (power supply) is controlled by the PLC and can produce a direct current of 15 kv-35 kv. The switch driving circuit is controlled by the master control board.

The high-voltage direct current charges the energy storage circuit via a high-voltage silicon stack and a current-limiting resistor. When the energy storage circuit is charged to a specific voltage (such as 30 kv), the thyratron is switched on instantaneously under the control of the switch driving circuit. The energy storage circuit discharges the primary winding of the high-voltage pulse transformer via the thyratron, and finally discharges to a load after the secondary winding is coupled to the energy, forming a high voltage pulse at the load end.

In this embodiment, the PLC adopts a Japan Mitsubishi FX3U series, a communication interface thereof with the master control board adopts an isolated RS232 communication mode, to ensure the reliability and stability, and interface circuits for connection to the button, pedal, and touch screen are common, which belong to the prior art and are described herein in detail.

In order to facilitate switching between a plurality of electrodes, the load end is connected to an electrode selection circuit 4. In this embodiment, for example, six electrodes are provided, wherein the same input end of each electrode is connected to two switches in parallel, the two switches are respectively referred to as high-voltage switch and low-voltage switch, all high-voltage switches are coupled to a high-voltage end of the secondary winding, and all low-voltage switches are coupled to a low-voltage end of the secondary winding. During the pulse release, the high-voltage end and the low-voltage end of the secondary winding each are connected to only one switch simultaneously at each time, that is, during the pulse release, only one high-voltage switch and one low-voltage switch of the six high-voltage switches and the six low-voltage switches are switched on (simultaneously).

Figure 3:
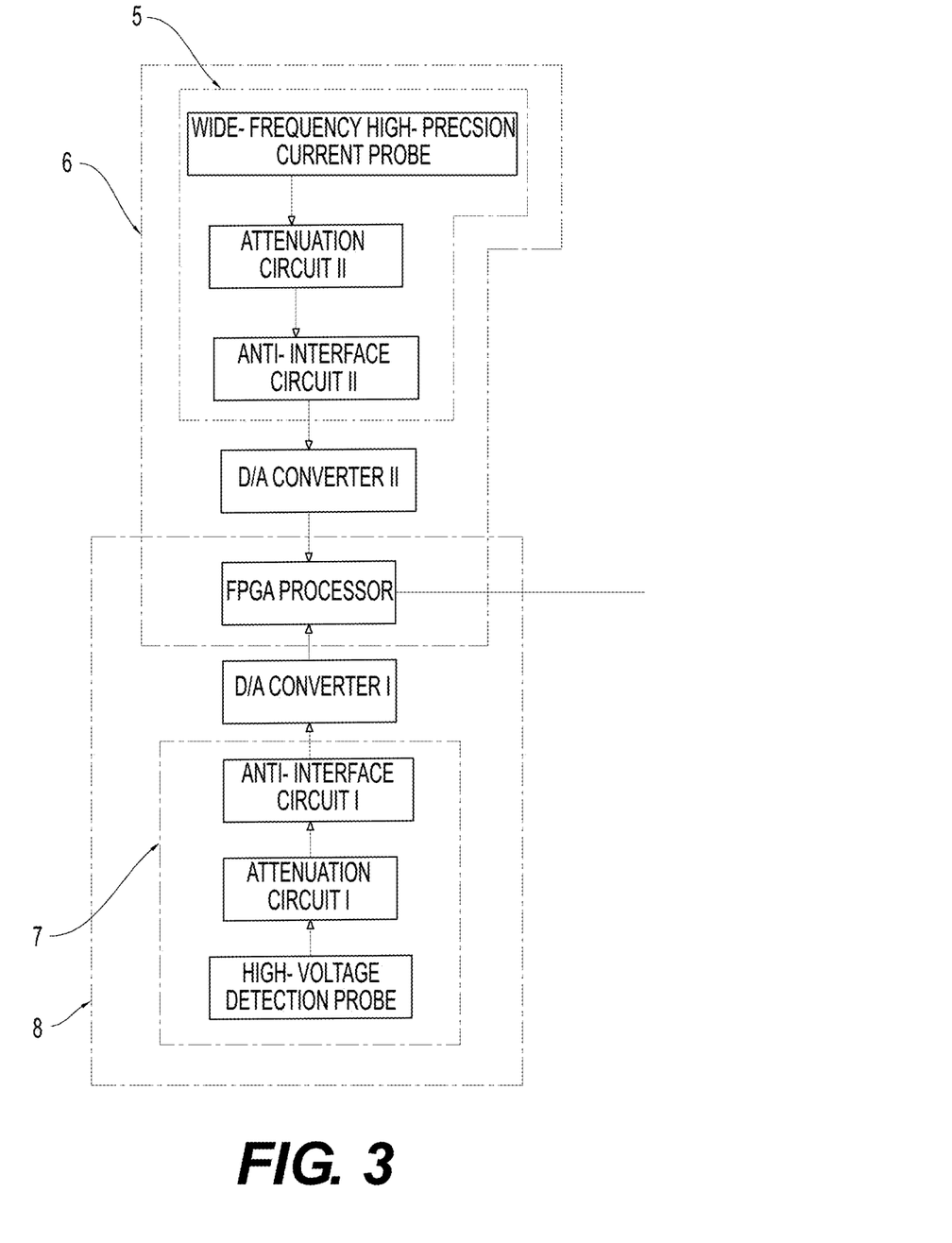
FIG. 3 is a schematic block diagram of a feedback circuit.

In order to facilitate understanding of a working effect of the pulse on the electrodes, the ablatograph further includes a feedback circuit for determining a therapeutic effect according to impedance of the diseased tissue between the two electrodes. Referring to FIG. 3, the feedback circuit includes a voltage detection circuit 8 and a current detection circuit 6. The voltage detection circuit 8 includes a voltage sampling circuit 7, a D/A converter I, and an FPGA processor for processing voltage sampling information. The current detection circuit 6 includes a current sampling circuit 5, a D/A converter II, and an FPGA processor for processing current sampling information. The voltage detection circuit 8 and the current detection circuit 6 share one FPGA processor. The FPGA processor transmits the processed voltage and current information to the master control board. The master control board computes the real-time impedance according to real-time voltage and current, and displays a relationship image of impedance with respect to time by means of the touch screen.

Figure 5:
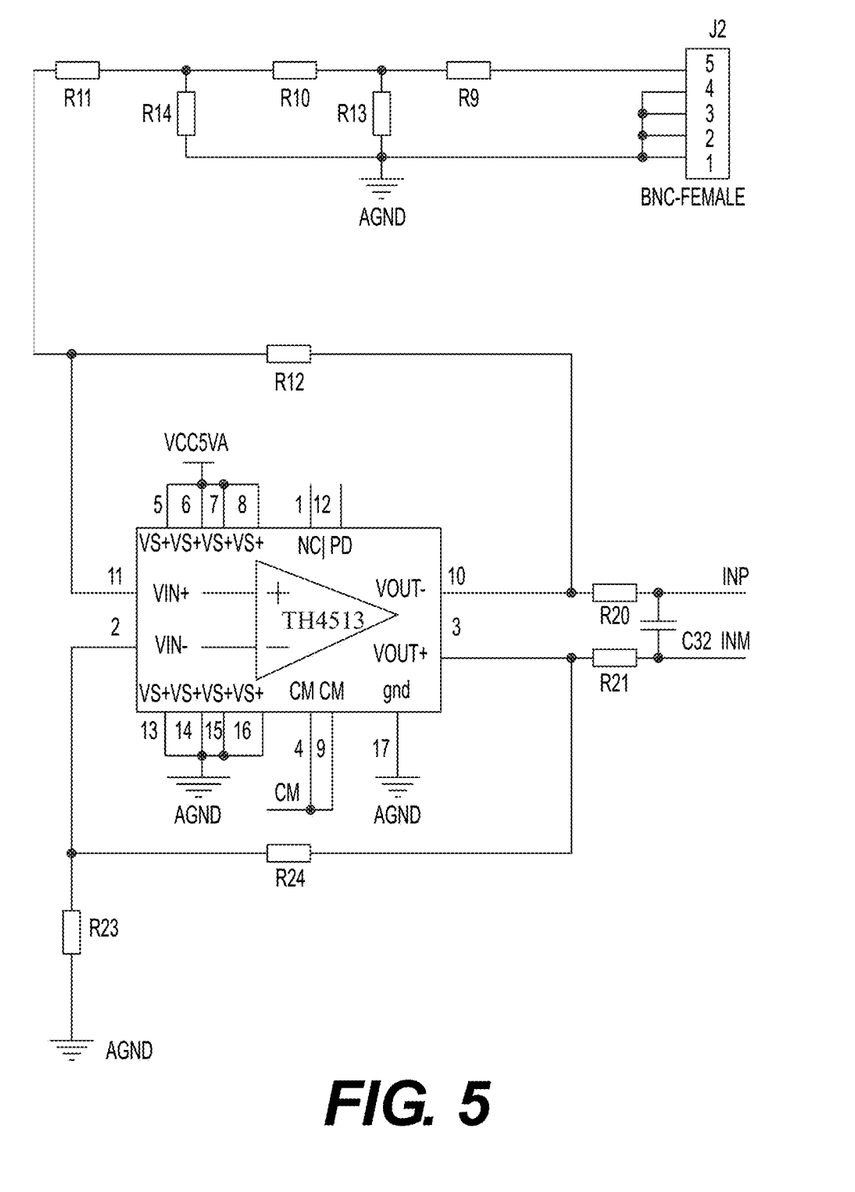
FIG. 5 is a circuit schematic diagram of a current sampling circuit.

Referring to FIG. 5, the voltage sampling circuit 7 includes a high-voltage detection probe, an attenuation circuit I, and an anti-interference circuit I. Since the electrodes are suspended for use on the tissue, there is no way to directly measure a secondary high-voltage pulse voltage of the high-voltage pulse transformer. Therefore, the high-voltage detection probe is placed at the primary end of the high-voltage pulse transformer, and the voltage of the secondary winding is indirectly obtained by detecting a voltage on the primary winding and by means of the turn ratio between the two windings.

Figure 6:
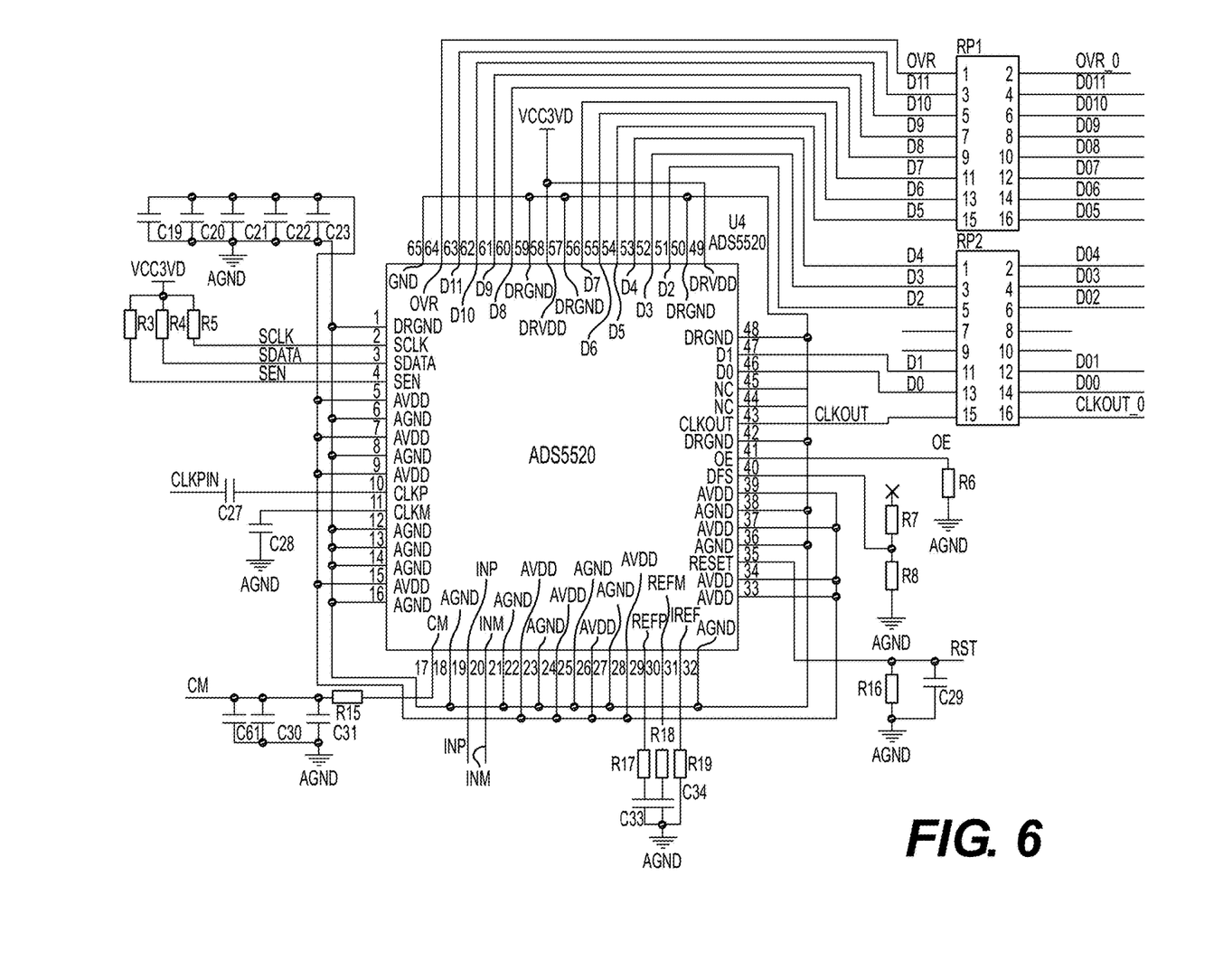
FIG. 6 is a schematic diagram of a D/A converter II and a peripheral circuit thereof.
Figure 7A:
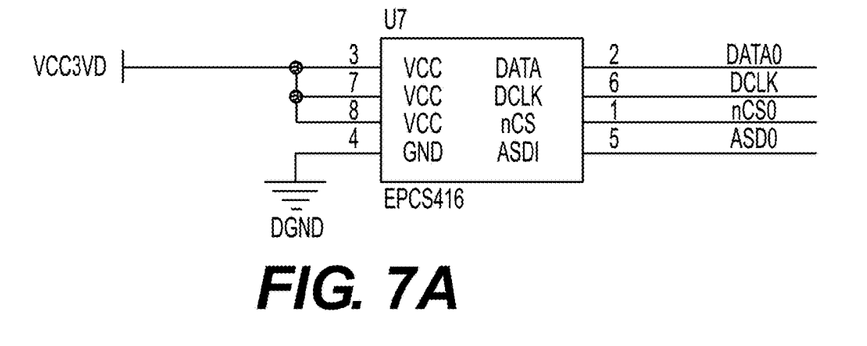
FIGS. 7A-7E show a schematic diagram of an FPGA processor and a peripheral circuit thereof.
Figure 7B:
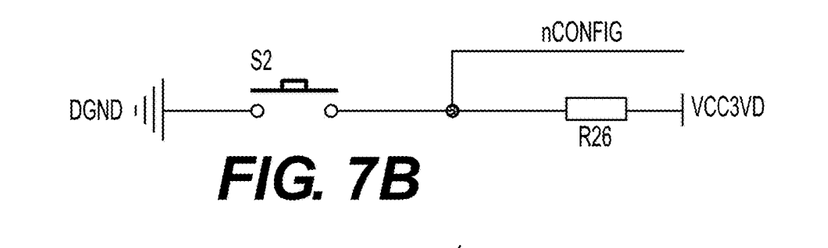
Figure 7C:
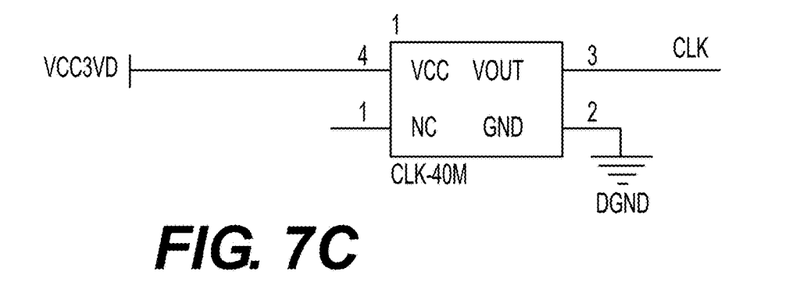
Figure 7D:
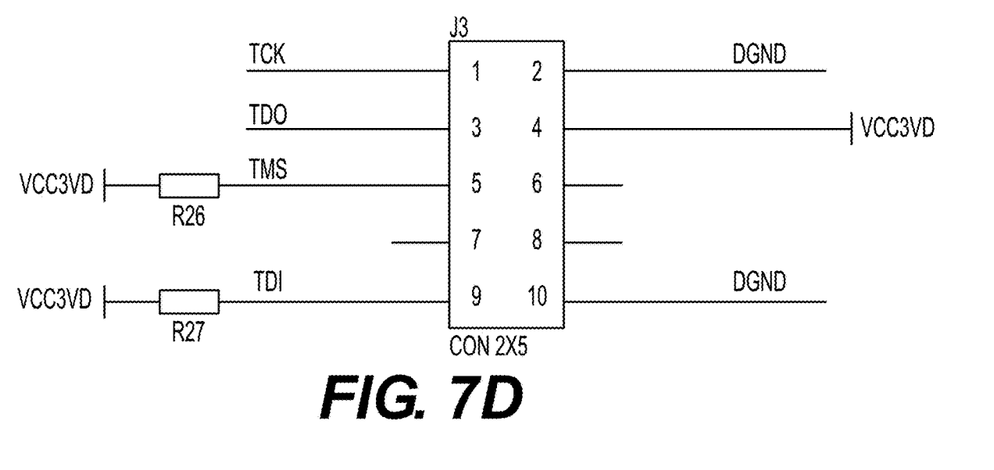
Figure 7E:
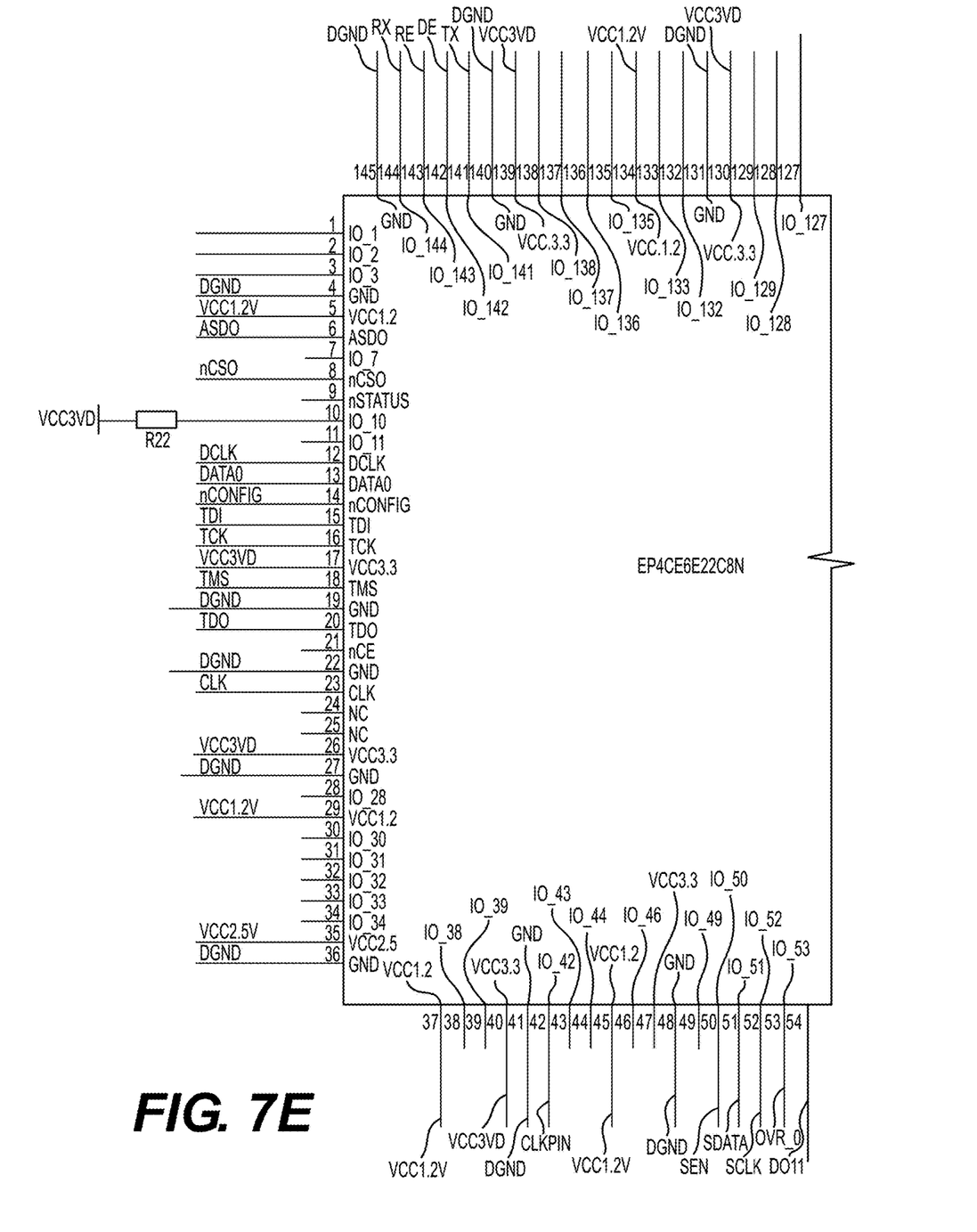

The current sampling circuit 5 includes a broadband high-precision current probe, an attenuation circuit II, and an anti-interference circuit II. The high-precision current probe is coupled to the secondary end of the high-voltage pulse transformer. The broadband high-precision current probe can sample a pulse amplitude current of at most 200 A. A current signal is converted into a voltage signal via a current sensor in the probe. After further attenuated by the attenuation circuit II (a T-type attenuation circuit consisting of resistors R9, R10, and R13) and subjected to impedance matching, the signal is transmitted to the anti-interference circuit II (in this embodiment, a TH4513 full differential operational amplifier is adopted). After a single-ended signal is converted into a differential signal, the differential signal is transmitted to the D/A converter II (in this embodiment, an ADS5520 full differential analog-to-digital converter is adopted; see FIG. 6 for details of connection of a chip pin and a peripheral circuit thereof). Data is converted into a digital quantity after analog-to-digital conversion, and the digital quantity is then transmitted to the FPGA processor (in this embodiment, EP4CE6E22C8N is adopted; see FIGS.

7A-7E for details of connection of a chip pin and a peripheral circuit thereof) for operational processing. The FPGA processor and the master control board adopt isolated RS485 communication.

A main working principle of this embodiment is as follows: before the electrodes transmit the pulse for the first time, the control device 2 determines the heart rhythm range and the upper and lower thresholds of the effective refractory period time (calculated by the DSP) by receiving a section of electrocardiographic waveform signal.

Then the pulse waveform generator 3 is controlled to be connected to the electrodes, and the pulse is transmitted by the electrodes in the effective refractory period. The duration (i.e., the length or number of transmitted pulses) of the connected state between the pulse waveform generator 3 and the electrodes in the current effective refractory period is controlled and adjusted by the control device 2 according to previous effective refractory period time. The duration is positively correlated with the length of the previous effective refractory period time. Compared with the prior art (pulses of a fixed length or fixed number are leased in the effective refractory period), the length (or number) of pulses released by the ablatograph in the effective refractory period can be dynamically adjusted with the previous effective refractory period time, so as to ensure the high proportion of the length of the released pulse in the current effective refractory period.

In addition, the control device 2 also compares the extreme value of the current effective refractory period with the previously determined upper and lower thresholds of the effective refractory period time, so as to determine whether the measure for decreasing the pulse energy in the next effective refractory period is to be taken to reduce the influence of the ablation pulse on the effective refractory period. Before the measure for decreasing the pulse energy is taken, the control device 2 further compares the extreme value of the current effective refractory period with the upper and lower thresholds (collected, statistically collected, analyzed, and entered in advance) of the heartbeat effective refractory period of the healthy people in the data memory, and then determines whether the release continues after the pulse energy is reduced in the next effective refractory period or the pulse release is interrupted in the next effective refractory period.

In this embodiment, the measure for decreasing the pulse energy is decreasing the number of pulses (i.e., decreasing the pulse length), thereby facilitating adjustment.

Figure 8:
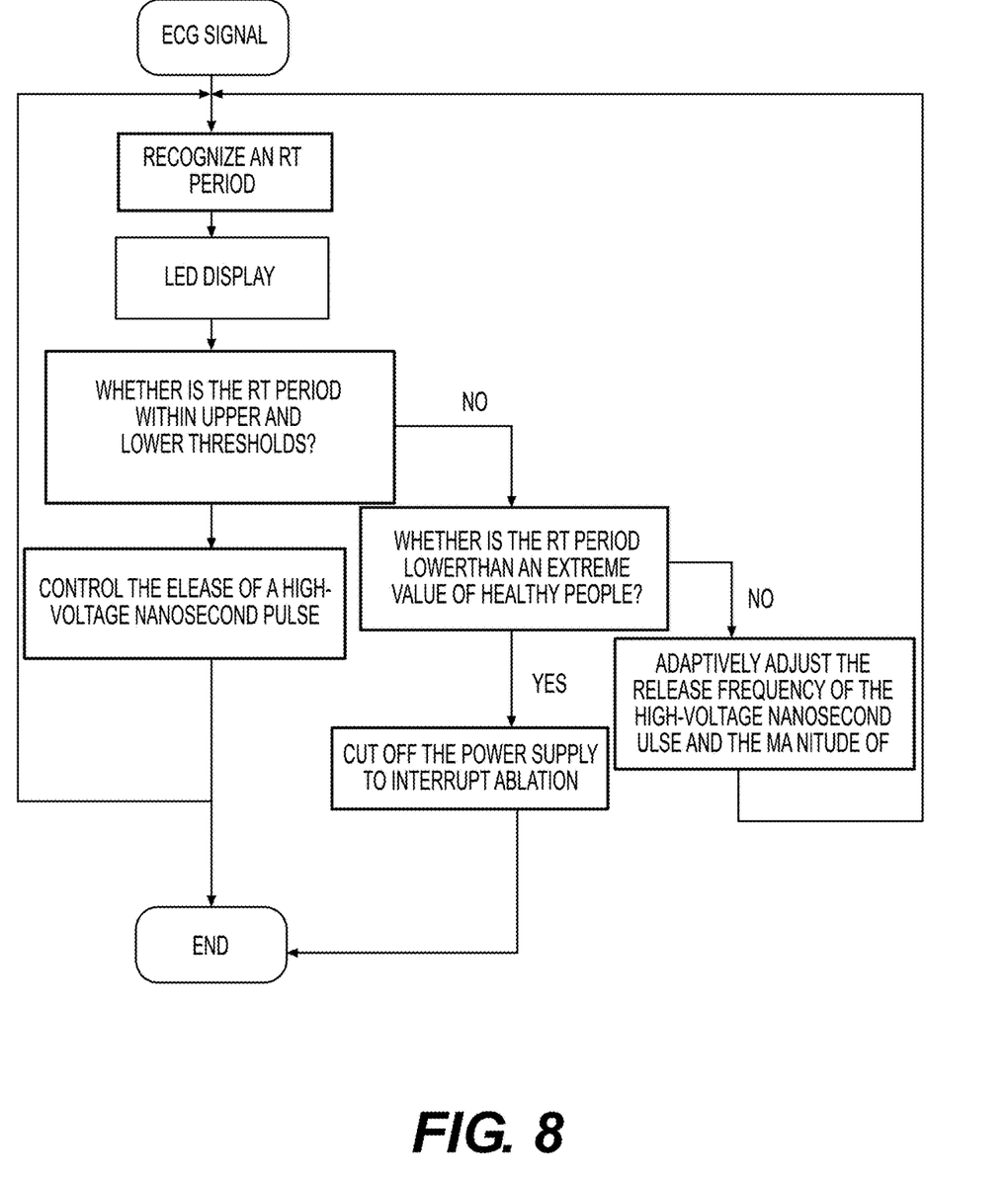
FIG. 8 is a flowchart of a control device determining, according to an effective refractory period, whether high-voltage pulses are to be released.

Referring to FIG. 8, in the case where the effective refractory period is maintained to be normal, the length of the pulse released in the current effective refractory period is increased as far as possible by means of two times of comparison and determination, thus realizing adaptive pulse adjustment.

The invention claimed is:

1. An electrocardiographic waveform-based adaptive pulse ablatograph, comprising:
   at least two electrodes configured to transmit an ablation pulse to a tissue during use;
   a pulse waveform generator coupled to the electrodes and configured to transmit a nanosecond pulse having a voltage of 15 kv-35 kv to the electrodes;
   an electrocardiographic detection device configured to collect an electrocardiographic waveform signal; and
   a control device in signal connection to the electrocardiographic detection device and in control connection to the pulse waveform generator; wherein
   the control device receives the electrocardiographic waveform signal; before the electrodes transmit the ablation pulse for the first time, the control device determines a heart rhythm range and upper and lower threshold voltages in a default effective refractory period time by receiving the electrocardiographic waveform signal;
   the control device controls duration of a connected state between the pulse waveform generator and the electrodes in a current effective refractory period according to the default effective refractory period time; the duration of the connected state between the pulse waveform generator and the electrodes in the current effective refractory period is positively correlated with the default effective refractory period time; and
   the control device compares a maximum voltage in the current effective refractory period with the upper and lower threshold voltages in the default effective refractory period time; if the maximum voltage in the current effective refractory period is between the upper and lower threshold voltages in the default effective refractory period time, the control device continues to control the electrodes and the pulse waveform generator to be connected again in a next effective refractory period; if the maximum voltage in the current effective refractory period is not between the upper and lower threshold voltages in the default effective refractory period time, the control device controls the electrodes to transmit the ablation pulse with a decreased pulse energy.

2. The ablatograph according to claim 1, wherein the control device controls the electrodes to transmit the ablation pulse with the decreased pulse energy through reducing the voltage of the pulse generated by the pulse waveform generator and decreasing the number or length of pulses released by the electrodes in a single effective refractory period.

3. The ablatograph according to claim 1, wherein the pulse width is between 100 ns-300 ns.

4. The ablatograph according to claim 2, wherein the control device is further connected to a memory configured to store a database of a pre-determined heartbeat effective refractory period time; if the maximum voltage in the current effective refractory period exceeds the upper and lower threshold voltages in the default effective refractory period time, the control device compares the maximum voltage in the current heartbeat effective refractory period with the database in the memory; if the maximum voltage in of the current heartbeat effective refractory period is between upper and lower threshold voltages in the pre-determined heartbeat effective refractory period, the control device controls the pulse waveform generator to decrease the pulse energy and then connects the pulse waveform generator to the electrodes; and if the maximum voltage in of the current heartbeat effective refractory period is beyond the upper and lower threshold voltages in the pre-determined heartbeat effective refractory period, the control device keeps the pulse waveform generator and the electrodes in a disconnected state in the next effective refractory period.

5. The ablatograph according to claim 4, wherein the control device controls the pulse waveform generator to decrease 0-50% of the pulse energy.

6. The ablatograph according to claim 4, wherein the database of the pre-determined heartbeat effective refractory period time comprises statistical data of pre-determined heart rhythm information in different genders and age brackets; and when comparing the current effective refractory period with the information in the database, the control device selects the pre-determined heart rhythm statistical information in the same gender and at similar ages as a current sampled patient.

7. The ablatograph according to claim 1, further comprising a feedback circuit for determining a therapeutic effect according to impedance of a diseased tissue between the two electrodes, wherein the feedback circuit comprises a voltage detection circuit and a current detection circuit.

8. The ablatograph according to claim 2, further comprising a feedback circuit for determining a therapeutic effect according to impedance of a diseased tissue between the two electrodes, wherein the feedback circuit comprises a voltage detection circuit and a current detection circuit.

9. The ablatograph according to claim 3, further comprising a feedback circuit for determining a therapeutic effect according to impedance of a diseased tissue between the two electrodes, wherein the feedback circuit comprises a voltage detection circuit and a current detection circuit.

10. The ablatograph according to claim 4, further comprising a feedback circuit for determining a therapeutic effect according to impedance of a diseased tissue between the two electrodes, wherein the feedback circuit comprises a voltage detection circuit and a current detection circuit.

11. The ablatograph according to claim 5, further comprising a feedback circuit for determining a therapeutic effect according to impedance of a diseased tissue between the two electrodes, wherein the feedback circuit comprises a voltage detection circuit and a current detection circuit.

12. The ablatograph according to claim 6, further comprising a feedback circuit for determining a therapeutic effect according to impedance of a diseased tissue between the two electrodes, wherein the feedback circuit comprises a voltage detection circuit and a current detection circuit.

13. The ablatograph according to claim 7, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

14. The ablatograph according to claim 8, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

15. The ablatograph according to claim 9, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

16. The ablatograph according to claim 10, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

17. The ablatograph according to claim 11, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

18. The ablatograph according to claim 12, wherein the pulse energy E, the pulse width t, the number N of pulses in a single heartbeat refractory period, a voltage U between the two electrodes, and the impedance R of the tissue between the two electrodes have the following relationship: $E=(U^2Nt)/R$.

* * * * *